(12) United States Patent
Park et al.

(10) Patent No.: US 11,152,634 B2
(45) Date of Patent: Oct. 19, 2021

(54) VOLTAGE CONTROL METHOD AND SYSTEM FOR FUEL CELL

(71) Applicants: HYUNDAI MOTOR COMPANY, Seoul (KR); KIA MOTORS CORPORATION, Seoul (KR)

(72) Inventors: Gun Hyung Park, Busan (KR); Dae Jong Kim, Yongin-si (KR); Seung Yoon Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 258 days.

(21) Appl. No.: 15/724,090

(22) Filed: Oct. 3, 2017

(65) Prior Publication Data

US 2018/0294495 A1 Oct. 11, 2018

(30) Foreign Application Priority Data

Apr. 11, 2017 (KR) ........................ 10-2017-0046546

(51) Int. Cl.
*H01M 8/04537* (2016.01)
*H01M 10/48* (2006.01)
(Continued)

(52) U.S. Cl.
CPC ..... *H01M 8/04552* (2013.01); *H01M 8/0488* (2013.01); *H01M 10/48* (2013.01); *H01M 16/006* (2013.01); *Y02B 90/10* (2013.01)

(58) Field of Classification Search
CPC .............................................. H01M 8/04522
See application file for complete search history.

(56) References Cited

U.S. PATENT DOCUMENTS 8,415,065 B2 * 4/2013 Yoshida ............ H01M 8/04873
429/430
9,034,495 B2 * 5/2015 Umayahara ....... H01M 8/04619
429/432

FOREIGN PATENT DOCUMENTS

JP 4888519 B2 2/2012
JP 5007665 B2 8/2012
(Continued)

OTHER PUBLICATIONS

Korean Office Action dated Jun. 25, 2021 issued in Korean Patent Application No. 10-2017-0046546.

*Primary Examiner* — Ula C Ruddock
*Assistant Examiner* — Thomas H. Parsons
(74) *Attorney, Agent, or Firm* — Morgan, Lewis & Bockius LLP

(57) ABSTRACT

A method of controlling voltage of a fuel cell includes steps of: determining whether a mode is a high-voltage avoidance mode of the fuel cell; controlling a fuel cell stack voltage to be at a predetermined reference value or less when the mode is the high-voltage avoidance mode of the fuel cell; monitoring individual cell voltages of the fuel cell and determining whether a maximum value of the monitored individual cell voltages exceeds a predetermined individual value; reducing a reference value of the fuel cell stack voltage when the maximum value of the monitored individual cell voltages exceed the predetermined individual value; and controlling the fuel cell stack voltage at the reduced reference value or less. The method and system for controlling fuel cell voltage is provided to secure durability and performance of individual cells of a fuel cell stack.

5 Claims, 2 Drawing Sheets

(51) Int. Cl.
*H01M 16/00* (2006.01)
*H01M 8/04858* (2016.01)

(56) References Cited

FOREIGN PATENT DOCUMENTS

| | | |
|---|---|---|
| KR | 10-2009-0097958 A | 9/2009 |
| KR | 10-1631150 B1 | 6/2016 |
| KR | 10-2016-0148817 A | 12/2016 |

* cited by examiner

VOLTAGE CONTROL METHOD AND SYSTEM FOR FUEL CELL

CROSS REFERENCE TO RELATED APPLICATION

The present application is based on and claims the benefit of priority to Korean Patent Application No. 10-2017-0046546, filed on Apr. 11, 2017, with the Korean Intellectual Property Office, the entire contents of which is incorporated herein for all purposes by this reference.

TECHNICAL FIELD

The present disclosure relates to a method and system for controlling voltage of a fuel cell, the method and system being able to improve durability of a fuel cell stack by varying the maximum instruction voltage valve of the fuel cell stack on the basis of individual cell voltage.

BACKGROUND

A fuel cell, which is a kind of device that converts chemical energy from a fuel into electrical energy through an electrochemical reaction in a fuel cell stack without changing the chemical energy into heat by burning the fuel, can be used not only for supplying power for industry, home, and vehicles, but for supplying power for small-sized electrical/electronic products, particularly, mobile devices.

In particular, recently, fuel cells that use energy produced by bonding hydrogen and oxygen have been studied. When a fuel cell stack is exposed to OCV (Open Circuit Voltage), it is damaged and the performance of the stack is deteriorated, so technologies for preventing this problem have been studied.

A technology of limiting the upper limit voltage of a fuel cell stack at a predetermined level to improve durability of the fuel cell stack has been disclosed. However, when the upper limit voltage of an entire stack is limited at a predetermined level, the individual cells of the stack are exposed to high voltage due to voltage differences among the individual cells even though the voltage of the entire stack does not exceed the upper limit voltage, so deterioration of the individual cells cannot be prevented.

The description provided above as a related art of the present disclosure is just for helping understanding the background of the present disclosure and should not be construed as being included in the related art known by those skilled in the art.

SUMMARY

The present disclosure has been made in an effort to solve the described problems and an object of the present disclosure is to provide a method and system for controlling voltage of a fuel cell, the method and system varying voltage of a fuel cell stack in accordance with the state of charge of a battery on the basis of the voltage of individual cells of a fuel cell stack.

In order to achieve the above object, according to an aspect of the present disclosure, there is provided a method of controlling voltage of a fuel cell, the method including steps of: determining whether a mode is a high-voltage avoidance mode of the fuel cell; controlling a fuel cell stack voltage to be at a predetermined reference value or less when the mode is the high-voltage avoidance mode of the fuel cell; monitoring individual cell voltages of the fuel cell and determining whether a maximum value of the monitored individual cell voltages exceeds a predetermined individual value; reducing a reference value of the fuel cell stack voltage when the maximum value of the monitored individual cell voltages exceeds the predetermined individual value; and controlling the fuel cell stack voltage at the reduced reference value or less.

The method may further include a step of monitoring a state of charge (SOC) of a battery before the reducing of a reference value of the fuel cell stack voltage, and in the step of reducing the reference value of the fuel cell stack voltage, a reduction amount of the reference value may be set different in accordance of the monitored state of charge of the battery.

In the step of reducing of the reference value of the fuel cell stack voltage, the larger the monitored state of charge of the battery, the smaller the reduction amount of the reference value of the fuel cell may be.

In the step of reducing of the reference value of the fuel cell stack voltage, the smaller the monitored state of charge of the battery, the larger the reduction amount of the reference value of the fuel cell may be.

When the state of charge of the battery monitored in the step of monitoring the state of charge (SOC) of the battery is a predetermined first state of charge or more, the reference value of the fuel cell stack voltage may be maintained in the reducing of a reference value of the fuel cell stack voltage, even if a maximum of the individual cell voltages exceeds the predetermined individual value.

The method may further include steps of: after the reducing of a reference value of the fuel cell stack voltage, monitoring a charging current for the battery; and reducing an output of the fuel cell stack when the monitored charging current for the battery is a predetermined charging current or more.

In the step of reducing the output of the fuel cell stack, an amount of air that may be supplied to the fuel cell stack may be reduced.

In the step of determining whether a mode is a high-voltage avoidance mode of the fuel cell, it may be determined that the mode is the high-voltage avoidance mode of the fuel cell when a required current for the fuel cell stack is a predetermined required value or less.

In order to achieve the above object, according to another aspect of the present disclosure, there is provided a system for controlling voltage of a fuel cell, the system including: a high-voltage avoidance mode determiner for determining whether a mode is a high-voltage avoidance mode of the fuel cell; an individual cell voltage monitor for calculating and monitoring voltages of individual cells of the fuel cell; and a fuel cell stack voltage controller for controlling a fuel cell stack voltage to be at a predetermined reference value or less when the high-voltage avoidance mode determiner determines that the mode is the high-voltage avoidance mode, and for reducing the predetermined reference value and controlling the fuel stack voltage at the reduced reference value or less when a maximum value of the voltages of the individual cells monitored by the individual cell voltage monitor exceeds a predetermined individual value.

The system may further include a state of charge (SOC) sensor for monitoring a state of charge of a battery, in which the fuel cell stack voltage controller may decrease a reduction amount of the reference value of the fuel cell as the state of charge of the battery monitored by the SOC sensor is large, and may increase the reduction amount of the reference value of the fuel cell as the monitored state of charge of the battery is small.

The system may further include a state of charge (SOC) sensor for monitoring a state of charge of a battery, in which when the state of charge of the battery monitored by the SOC sensor is a predetermined state of charge or more, the fuel cell stack voltage controller may maintain the reference value of the fuel cell stack voltage even if the maximum value of the individual cell voltages exceeds the predetermined individual value.

The system may further include: a charging current sensor for monitoring the charging current for the battery; and an output controller for controlling an output of the fuel cell stack, in which when the charging current for the battery monitored by the charging current sensor is a predetermined charging current or more, the output controller may reduce the output of the fuel cell stack.

According to the method and system for controlling fuel cell voltage, it is possible to further secure durability and performance of individual fuel cells, as compared with a configuration that uses an upper limit voltage of a stack.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
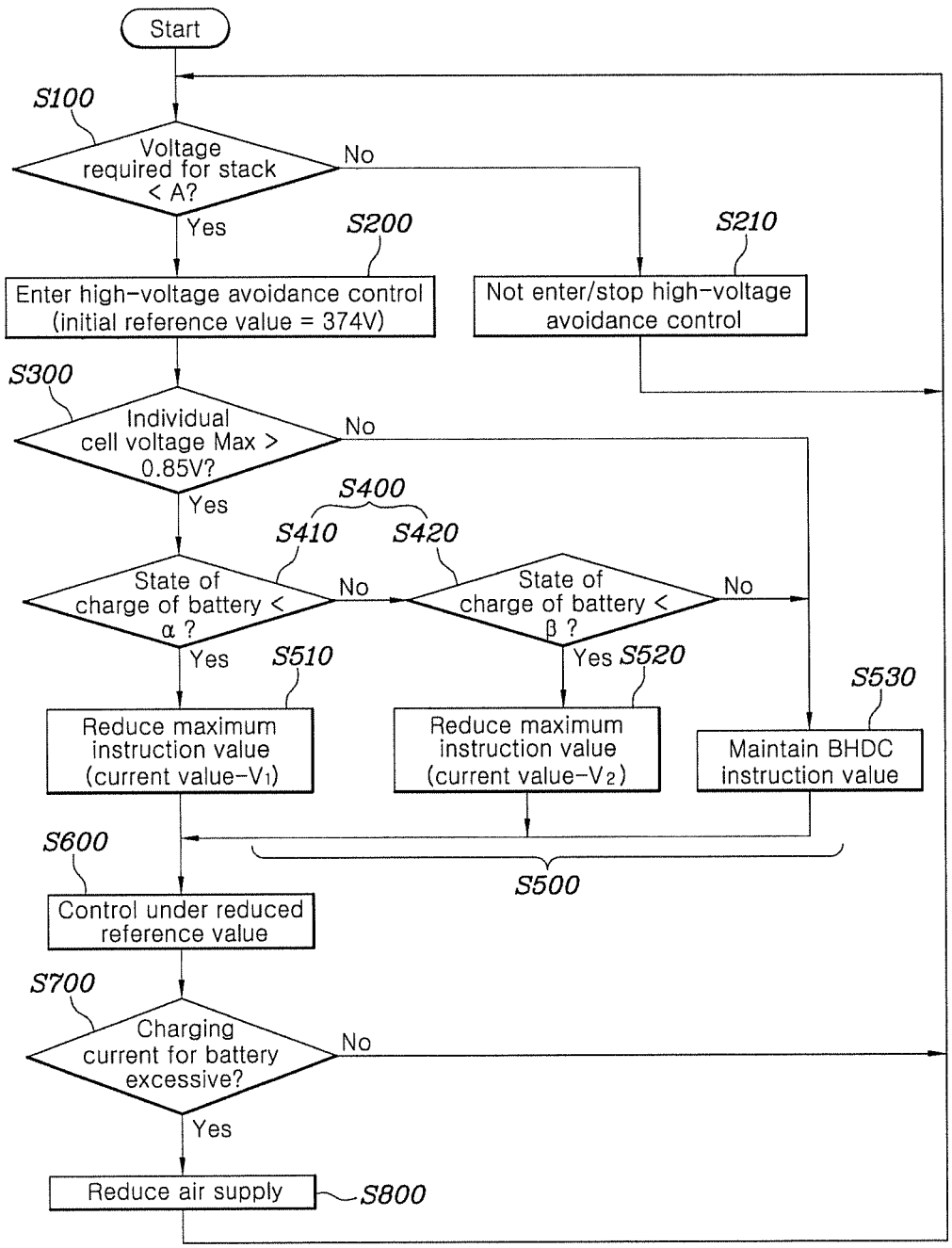
FIG. 1 is a flowchart illustrating a method of controlling voltage of a fuel cell according to an embodiment of the present disclosure.

Hereinafter, exemplary embodiments of the present disclosure will be described in detail with reference to the accompanying drawings. FIG. 1 is a flowchart illustrating a method of controlling voltage of a fuel cell according to an embodiment of the present disclosure and FIG. 2 is a diagram illustrating the configuration of a system for controlling voltage of a fuel cell according to an exemplary embodiment of the present disclosure.

Referring to FIG. 1, a method of controlling voltage of a fuel cell according to an embodiment of the present disclosure includes: determining whether a mode is a high-voltage avoidance mode of a fuel cell (S100); controlling fuel cell stack voltage at a predetermined reference value or less when the mode is the high-voltage avoidance mode of the fuel cell (S200); monitoring individual cell voltages of the fuel cell and determining whether the maximum value of the monitored individual cell voltages exceeds a predetermined individual value (S300); reducing the reference value of the fuel cell stack voltage when the monitored individual cell voltages exceed the individual value (S500); and controlling the fuel cell stack voltage at the reduced reference value or less (S600).

According to the method of controlling voltage of a fuel cell, it is possible to secure durability of the individual cells by reducing the reference value of the fuel cell stack by monitoring whether the individual cell voltages of the fuel cell exceed the individual value.

Figure 2:
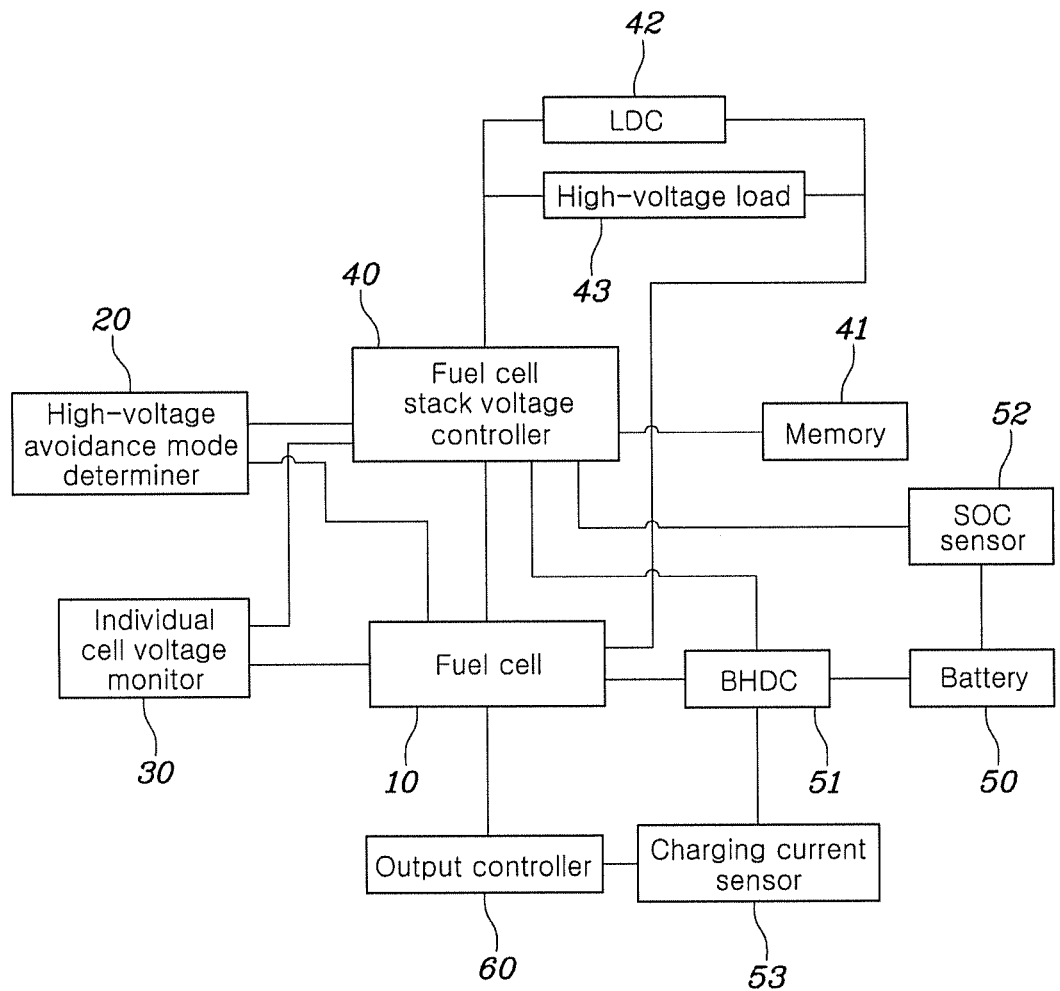
FIG. 2 is a diagram illustrating the configuration of a system for controlling voltage of a fuel cell according to an exemplary embodiment of the present disclosure.

Referring to FIG. 2, a system for controlling voltage of a fuel cell according to an embodiment of the present disclosure includes: a high-voltage avoidance mode determiner 20 that determines whether a mode is the high-voltage avoidance mode of a fuel cell 10; an individual cell voltage monitor 30 that calculates and monitors voltages of individual cells of the fuel cell 10; and a fuel cell stack voltage controller 40 that controls fuel cell stack voltage at a predetermined reference value or less when the high-voltage avoidance mode determiner determines that the mode is the high-voltage avoidance mode, and reduces the predetermined reference value and controls the fuel stack voltage at the reduced reference value or less when the maximum value of the individual cell voltages monitored by the individual cell voltage monitor 30 exceeds a predetermined individual value.

The high-voltage avoidance mode determiner 20, the individual cell voltage monitor 30, and the fuel cell stack voltage controller 40 are implemented with software instructions executed on a processor.

The method of controlling voltage of a fuel cell according to an embodiment of the present disclosure shown in FIG. 1 can be achieved by the system for controlling voltage of a fuel cell stack shown in FIG. 2.

Accordingly, referring to FIGS. 1 and 2, the determining of whether a mode is a high-voltage avoidance mode of a fuel cell (S100) is a step in which the high-voltage avoidance mode determiner 20 determines whether a mode is the high-voltage avoidance mode by determining whether the fuel cell 10 is exposed to high voltage. In detail, when voltage required for the fuel cell stack is a predetermined required value or less, it is possible to determine that the mode is the high-voltage avoidance mode of the fuel cell. The required value A may be set, for example, to 50 [A].

When the fuel cell does not correspond to the high-voltage avoidance mode condition (S210), the high-voltage avoidance mode is not entered or turned off.

When the mode is the high-voltage avoidance mode of the fuel cell, the controlling of the fuel cell stack voltage at a predetermined reference value or less (S200) is a step in which the fuel cell stack voltage controller 40 prevents the stack of the fuel cell 10 from being exposed to voltage exceeding a reference value stored in a memory 41 connected to the fuel cell stack voltage controller 40. The reference value may be initially set to 374V in the memory 41.

In detail, in order to control the fuel cell stack voltage at the reference value or less, it may be possible to set a maximum value as a reference value in an instruction value of a bidirectional high-voltage converter (BHDC) 51 connected to the fuel cell 10 in order to charge a battery 50 or it may be possible to make a current be consumed through a low-voltage converter (LDC) 42 or a high-voltage load 43 connected to electrical components.

The monitoring of individual cell voltages of the fuel cell and determining of whether the maximum value of the monitored individual cell voltages exceed a predetermined individual value (S300) is a step in which the individual cell voltage monitor 30 monitors the voltages of the individual cells and determines whether the maximum value exceeds the individual value. The individual value may be, for example, set to 0.85 [V] (374 [V]/440 [cell]=0.85 [V/cell]).

When the maximum value of the individual cell voltages does not exceed the individual value, it may be possible to maintain rather than reduce the reference value (S530).

When the maximum value of the monitored individual cell voltages exceeds the individual value, it is possible to check the chargeable amount of the battery 50 by monitoring the state of charge of the battery 50 through an SOC sensor 52 connected to the battery 50 in monitoring the state of charge (SOC) of the battery (S400), before the reducing of the reference value of the fuel cell stack voltage (S500).

The reducing of the reference value of the fuel cell stack voltage (S500) can set the reduction amount of the reference value different in accordance with the state of charge of the battery monitored by the fuel cell stack voltage controller 40. The reduction amount of the reference value of the state of charge of the battery may be stored in advance in the memory 41 connected to the stack voltage controller 40.

In detail, since the larger the monitored state of charge of the battery, the smaller the chargeable amount of the battery, the amount of reducing the reference value of the fuel cell may be controlled to be decreased. In contrast, since the smaller the monitored state of charge of the battery, the larger the chargeable amount of the battery, the amount of reducing the reference value of the fuel cell may be controlled to the increased.

However, when the monitored state of charge of the battery is a predetermined state of charge or more, it is possible to maintain the reference value of the fuel cell stack voltage even if the maximum of the individual cell voltages exceeds the predetermined individual value, in the reducing of the reference value of the fuel cell stack voltage (S500).

For example, references of the state of charge of the battery are set as α and β and it is determined whether the state of charge is smaller than α (S410), is equal to or over α and less than β (S420), or is β or more. Further, when the state of charge of the battery is smaller than α, the reduction amount of the reference value is set at V1 (S510), and when it is equal to or over α and less than β, the reduction amount of the reference value is set at V2 (S530), and when it is β or more, the reference value is maintained (S530). For example, β is the predetermined state of charge and V1 is larger than V2. For example, α may be set at 40% of the maximum state of charge of the battery, β may be set at 60% of the maximum state of charge of the battery, V1 may be set at 20 [V], and V2 may be set at 10 [V].

Since when the state of charge of the battery is small, the upper limit voltage reference value of the fuel cell stack is largely reduced to charge the battery through the control described above, the durability of the stack can be improved. Further, when the state of charge of the battery is large, it is difficult to further charge the battery, so the upper limit voltage reference value of the stack of the battery is slightly reduced or maintained, whereby it is possible to increase the efficiency of the system.

The controlling of the fuel cell stack voltage at the reduced reference value or less (S600) is a step in which the fuel cell stack voltage controller 40 controls the voltage of the fuel cell 10 at the reduced or maintained reference value or less.

In detail, in order to control the fuel cell stack voltage at the reference value or less, it may be possible to set a maximum value as a reference value in an instruction value of a bidirectional high-voltage converter (BHDC) 51 connected to the fuel cell 10 in order to charge a battery 50 or it may be possible to make a current be consumed through a low-voltage converter (LDC) 42 or a high-voltage load 43 connected to electrical components.

After the reducing of the reference value of the fuel cell stack voltage, a charging current for the battery is monitored (S700), in which a charging current sensor 53 connected to the bidirectional high-voltage converter (BHDC) 51 determines whether or not the charging current flowing to the battery 50 is a predetermined charging current or more. The predetermined charging current, for example, may be set at 2 [A], and when the charging current flowing to the battery 50 is 2 [A] or more, it may be determined that the charging current for the batter is excessive.

When the monitored charging current for the battery is the predetermined charging current or more, the output of the stack is reduced (S800), in which an output controller 60 reduces the output of the stack. When the monitored state of charge of the battery is not a predetermined second state of charge or more, the output of the stack is not reduced.

In detail, in the reducing of output of the stack (S800), it is possible to reduce the output of the stack by reducing the amount of air that is supplied to the fuel cell stack.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A method of controlling voltage of a fuel cell, the method comprising steps of:
   determining whether a mode is a high-voltage avoidance mode of the fuel cell;
   controlling a fuel cell stack voltage to be at a predetermined reference value or less when the mode is the high-voltage avoidance mode of the fuel cell;
   monitoring individual cell voltages of the fuel cell and determining whether a maximum value of the monitored individual cell voltages exceeds a predetermined individual value;
   monitoring a state of charge (SOC) of a battery;
   reducing a reference value of the fuel cell stack voltage when the maximum value of the monitored individual cell voltages exceeds the predetermined individual value; and
   controlling the fuel cell stack voltage at the reduced reference value or less,
   wherein in the step of reducing a reference value of the fuel cell stack voltage,
   a reduction amount of the reference value is set differently in accordance with the monitored SOC of the battery,
   the larger the monitored SOC of the battery, the smaller the reduction amount of the reference value of the fuel cell stack voltage, and
   the smaller the monitored SOC of the battery, the larger the reduction amount of the reference value of the fuel cell stack voltage.

2. The method of claim 1, wherein when the monitored SOC of the battery is a predetermined state of charge or more, the reference value of the fuel cell stack voltage is maintained in the step of reducing a reference value of the fuel cell stack voltage, even if a maximum of the individual cell voltages exceeds the predetermined individual value.

3. The method of claim 1, further comprising steps of:
   after the step of reducing a reference value of the fuel cell stack voltage,
   monitoring a charging current for the battery; and
   reducing an output of the fuel cell stack when the monitored charging current for the battery is a predetermined charging current or more.

4. The method of claim 3, wherein in the step of reducing an output of the fuel cell stack, an amount of air that is supplied to the fuel cell stack is reduced.

5. The method of claim 1, wherein in the step of determining whether a mode is a high-voltage avoidance mode of the fuel cell, it is determined that the mode is the high-voltage avoidance mode of the fuel cell when a required current for the fuel cell stack is a predetermined required value or less.

* * * * *